United States Patent
Akhmetov

(10) Patent No.: US 8,270,437 B2
(45) Date of Patent: Sep. 18, 2012

(54) WIRELESS NETWORK AND METHOD FOR COMMUNICATING AGGREGATED PACKETS

(75) Inventor: Dmitry Vadimovich Akhmetov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 12/601,915

(22) PCT Filed: Jun. 18, 2007

(86) PCT No.: PCT/RU2007/000332
§ 371 (c)(1),
(2), (4) Date: Nov. 25, 2009

(87) PCT Pub. No.: WO2009/002201
PCT Pub. Date: Dec. 31, 2008

(65) Prior Publication Data
US 2010/0172334 A1    Jul. 8, 2010

(51) Int. Cl.
*H04W 4/00* (2009.01)
(52) U.S. Cl. .................. 370/473; 370/338
(58) Field of Classification Search .......... 370/338, 370/236, 252, 470, 471, 473, 474, 522, 469, 370/328
See application file for complete search history.

(56) References Cited

U.S. PATENT DOCUMENTS

| | | | |
|---|---|---|---|
| 2005/0195858 A1 | 9/2005 | Nishibayashi et al. | |
| 2005/0238016 A1 | 10/2005 | Nishibayashi et al. | |
| 2005/0265297 A1* | 12/2005 | Nakajima et al. | 370/338 |
| 2006/0013256 A1* | 1/2006 | Lee et al. | 370/473 |
| 2006/0078001 A1* | 4/2006 | Chandra et al. | 370/473 |
| 2006/0107166 A1 | 5/2006 | Nanda | |
| 2006/0280204 A1* | 12/2006 | Nagata et al. | 370/473 |
| 2006/0285517 A1* | 12/2006 | Kakani | 370/329 |
| 2007/0286149 A1* | 12/2007 | Yamamoto et al. | 370/345 |
| 2009/0238208 A1* | 9/2009 | Naka | 370/470 |

FOREIGN PATENT DOCUMENTS

| | | |
|---|---|---|
| CN | 1665195 A | 9/2005 |
| CN | 1691663 A | 11/2005 |
| EP | 1571773 | 9/2005 |
| EP | 1571773 A2 | 9/2005 |
| EP | 1589704 A2 | 10/2005 |
| EP | 1626519 A2 | 2/2006 |
| WO | WO-2006/134704 A1 | 12/2006 |
| WO | WO-2006134704 A1 | 12/2006 |
| WO | WO-2009002201 A1 | 12/2008 |

OTHER PUBLICATIONS

"European Application Serial No. 07861015.1, Office Action mailed Nov. 5, 2010", 5 pgs.
"Korean Application Serial No. 2009-7026570, Office Action mailed Mar. 24, 2011" 2 pgs.

(Continued)

*Primary Examiner* — Brian Nguyen
(74) *Attorney, Agent, or Firm* — Schwegman, Lundberg & Woessner, P.A.; Gregory J. Gorrie

(57) ABSTRACT

Embodiments of a wireless network and method for communicating aggregated packets are generally described herein. In some embodiments, an aggregation header frame that identifies the originator is included in an aggregation of media-access control (MAC) frames to allow the originator to be easily identified when none of the MAC frames are properly received.

25 Claims, 4 Drawing Sheets

OTHER PUBLICATIONS

"IEEE Standard for Information Technology—Telecommunications and Information Exchange Between Systems—Local and Metopolitan Area Networks—Specific Requirements", *Part 11: Wireless LAN Medium Access Control (MAC) and Physical Layer (PHY) Specifications, Amendment 8: Medium Access Control (MAC) Quality of Service Enhancements, IEEE Computer Society, IEEE Std. 802.11e*, (Nov. 11, 2005), 1-189.

"International Application Serial No. PCT/RU2007/000332, Search Report mailed Jul. 2, 2008", P220, 6 pgs.

"International Application Serial No. PCT/RU2007/000332, Written Opinion mailed Jul. 2, 2008", P237, 8 pgs.

"Chinese Application Serial No. 200780053391.1, Office Action mailed Feb. 21, 2012", 21 pgs.

\* cited by examiner

WIRELESS NETWORK AND METHOD FOR COMMUNICATING AGGREGATED PACKETS

This application is a U.S. National Stage Filing under 35 U.S.C. 371 from International Application No. PCT/RU2007/000332, filed Jun. 18, 2007 and published in English as WO 2009/002201 on Dec. 31, 2008, which application and publication are incorporated herein by reference in their entireties.

TECHNICAL FIELD

Some embodiments pertain to wireless communications. Some embodiments pertain to the communication of an aggregation of packets.

BACKGROUND

Some wireless communication networks, such as high-throughput (HT) wireless local area networks (HT-WLAN), have attempted to increase the throughput of a communication channel by the aggregation of packets. In these networks, many packets may be concatenated together prior to transmission without any interframe spacing (IFS) therebetween. The elimination of the IFS as well as the elimination of overhead issues associated with transmitting individual packets helps to increase throughput. One issue with these networks is that improper receipt of the aggregation may result in an increase in the average end-to-end (ETE) delay, particularly when the responder is unable to identify the originator.

Thus, there are general needs for wireless networks and methods that may reduce the average ETE delay of packets. There are also general needs for wireless networks and methods that increase throughput and utilize the channel more efficiently.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
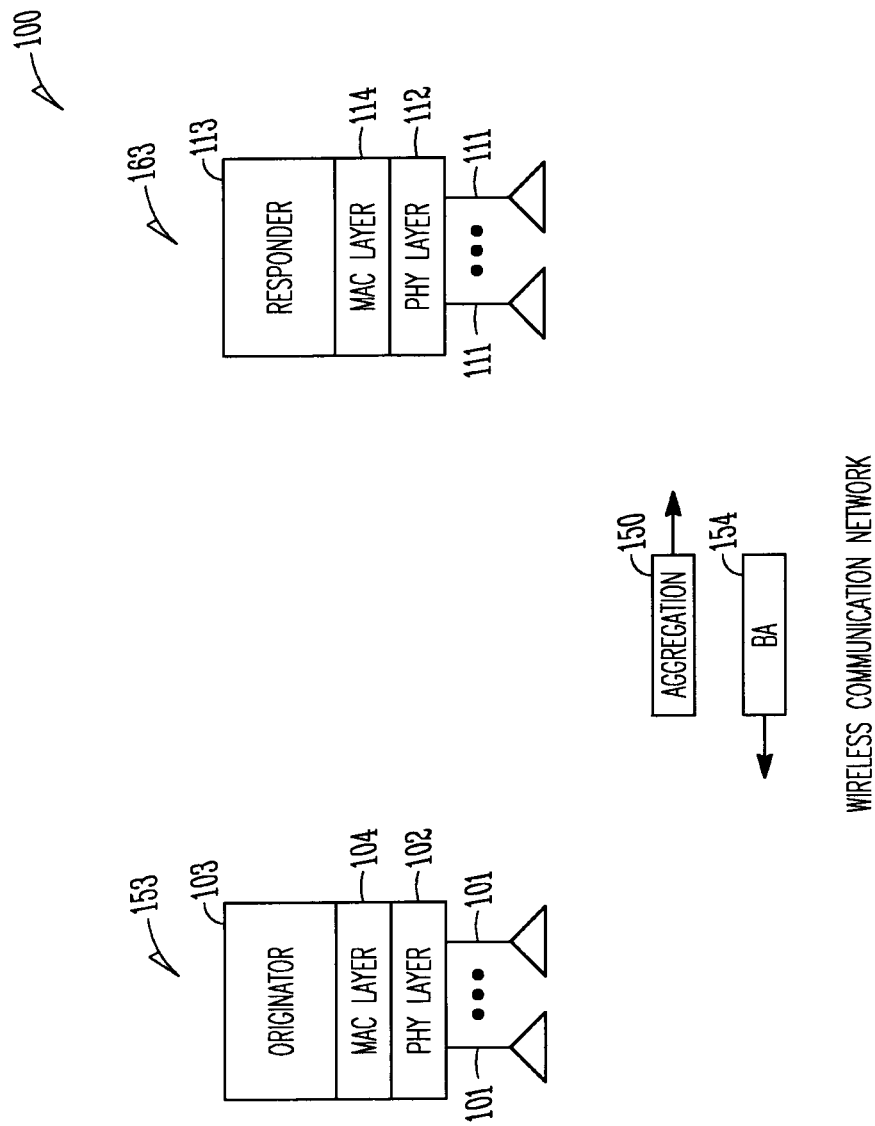
FIG. 1 illustrates a wireless communication network in accordance with some embodiments of the present invention.

FIG. 1 illustrates a wireless communication network in accordance with some embodiments of the present invention. Wireless communication network 100 may include two or more wireless communication devices, such as wireless communication device 103 and wireless communication device 113. Wireless communication devices 103 and 113 may communicate therebetween using wireless communication signals, discussed in more detail below.

Wireless communication device 103 may comprise media-access control (MAC) layer circuitry 104, physical (PHY) layer circuitry 102, and one or more antennas 101. Wireless communication device 113 may comprise MAC layer circuitry 114, PHY layer circuitry 112, and one or more antennas 111. Wireless communication device 103 may originate packets and may be referred to as originator 153, and wireless communication device 113 may respond to the receipt of packets from wireless communication device 103 and may be referred to as responder 163. It should be noted that either wireless communication device 103 or wireless communication device 113 may operate as an originator of packets, and either wireless communication device 103 or wireless communication device 113 may operate as a responder to packets.

In accordance with some embodiments, MAC layer circuitry 104 may aggregate a plurality of MAC frames to generate aggregation 150 for transmission by PHY layer circuitry 102 using one or more of antennas 101. PHY layer circuitry 112 may receive aggregation 150 through one or more of antennas 111. Aggregation 150 may comprise a plurality MAC frames and an aggregation header frame that at least identifies originator 153. MAC layer circuitry 114 may check the integrity of each of the MAC frames using integrity checking portions of each MAC frame to determine which of the MAC frames were received properly. When none of the MAC frames (other than the aggregation header frame) of aggregation 150 are received properly (e.g., due to interference), MAC circuitry 114 may identify an address of originator 153 from the aggregation header frame and PHY layer circuitry 112 may transmit block acknowledge (BA) 154 to originator 153. BA 154 may indicate that none of the MAC frames (other than the aggregation header frame) of aggregation 150 were received properly.

In some embodiments, PHY layer circuitry 112 may parse the frames of aggregation 150 in the order in which they are received. In these embodiments, the address of the originator may be determined from the aggregation header frame prior to determining if other frames of aggregation 150 are received properly. It should be noted that there is no requirement to identify the address of the originator from the aggregation header frame only after when the address of the originator cannot be identified from the other frames of aggregation 150.

In some embodiments, because the aggregation header frame may be much shorter than the MAC frames of aggregation 150, there is a much greater probability that it will be received properly by responder 163, and therefore a much greater probability that responder 163 will generate BA 154. In some embodiments, responder 163 may treat the aggregation header frame as another MAC frame, allowing it to easily identify originator 153. In conventional systems, when no MAC frames are received properly, responder 163 will be unable to generate BA 154 because the originator's address cannot be properly determined. The inclusion of the aggregation header frame in aggregation 150 may reduce the average ETE delay of packets transmitted between originator 153 and responder 163, may increase the throughput of the channel, and may utilize the channel more efficiently. The inclusion of the aggregation header frame in aggregation 150 may also improve the stability of the link between originator 153 and responder 163. These embodiments are discussed in more detail below.

Although wireless communication devices 103 and 113 are illustrated as having several separate functional elements, one or more of the functional elements may be combined and may be implemented by combinations of software-configured elements such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of wireless communication devices 103 and 113 may refer to one or more processes operating on one or more processing elements.

Figure 2:
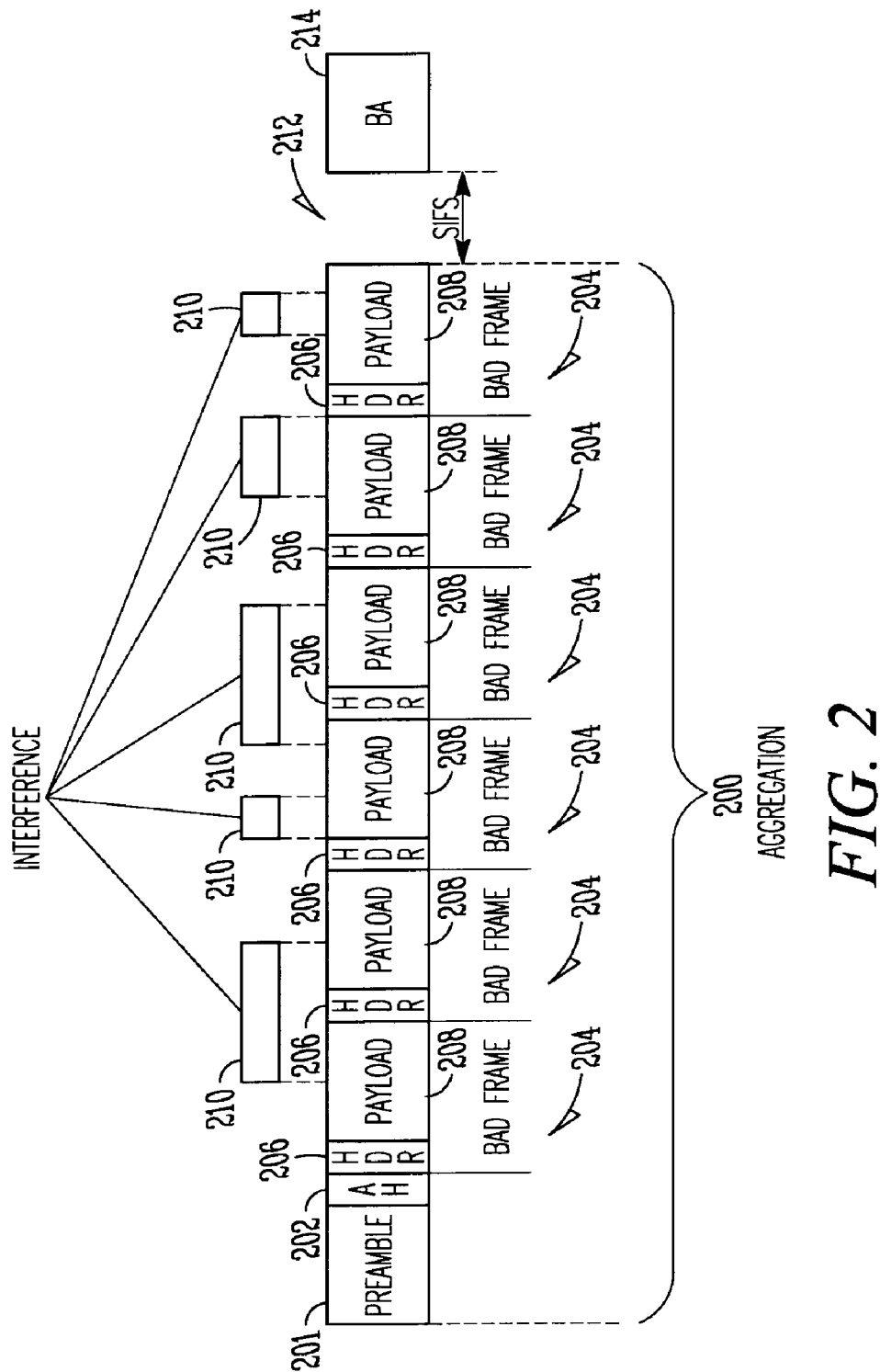
FIG. 2 illustrates an aggregation and block acknowledge in accordance with some embodiments of the present invention.

FIG. 2 illustrates an aggregation and block acknowledge in accordance with some embodiments of the present invention. Aggregation 200 may correspond to aggregation 150 (FIG. 1) and block acknowledge (BA) 214 may correspond to BA 154 (FIG. 1), although the scope of the invention is not limited in this respect.

Aggregation 200 comprises aggregation header (AH) frame 202 followed by a plurality of MAC frames 204. Each of MAC frames 204 may comprise header 206, payload 208, and an integrity checking portion (not separately illustrated).

In accordance with some embodiments, responder 163 (FIG. 1) may receive aggregation 200 from originator 153 (FIG. 1) and may check the integrity of each of MAC frames 204 using integrity checking portions to determine which of MAC frames 204 were received properly. When none of MAC frames 204 of aggregation 200 are received properly due to interference 210, responder 163 may identify the address of originator 153 from aggregation header frame 202 and may transmit BA 214 to originator 153 using the address of originator 153. BA 214 may indicate that none of MAC frames 204 were received properly.

Interference 210 is illustrated in FIG. 2 as being present during the receipt of each of MAC frames 204 causing each of MAC frames 204 to be received improperly. In this example, the integrity check performed by responder 163 on each of MAC frames 204 may indicate that none of MAC frames were received properly and therefore the address of originator 153 cannot be determined from any of headers 206. Interference 210 may be caused by many sources, including other wireless communication devices in nearby wireless networks, although the scope of the invention is not limited in this respect.

In some embodiments, BA 214 may be an implicit BA that responder 163 may generate in response to aggregation 200, unlike an explicit BA which is generated in response to a block acknowledge request (BAR) frame from originator 153. In these embodiments, in response to receipt of BA 214, originator 153 may refrain from entering a retransmit state and does not need to send a BAR frame to the responder 163 to request a BA. In this way, originator 153 does not need to send a BAR requesting a BA, avoiding the loss of time associated with the BAR transmission. The addition of aggregation header frame 202 may give responder 163 an additional chance to identify the originator's address and to respond to it with BA frame 214. This may allow originator 153 to continue data transmission without entering into the retransmission state, which allows the medium to be used more efficiently and may decrease the ETE delay of the packets in comparison with traditional retransmission schemes. In some embodiments, the ETE delay may be decreased by an average of 10% in a peer-to-peer connection.

Without aggregation header frame 202, when no MAC frames 204 are received properly, originator 153 may send a BAR to request the status of MAC frames 204. Responder 163 will respond back with a BA indicating that no MAC frames 204 were received properly. The use of aggregation header frame 202 reduces this waste of time and bandwidth.

In accordance with embodiments of the present invention, when originator 153 receives BA 214 indicating that none of MAC frames 204 were received properly, originator 153 may resend aggregation 200 at the same rate, may resend aggregation 200 at a lower rate, or may delay resending aggregation and continue to utilize the medium for the transmission of other data. When originator 153 receives BA 214 indicating that some of MAC frames 204 were received properly, originator 153 may resend the MAC frames that were not received properly as part of another aggregation either at the same rate or at a lower rate, or originator 153 may delay resending the MAC frames that were not received properly and may continue to utilize the medium for the transmission of other data.

In some embodiments, when at least one of MAC frames 204 of aggregation 200 is received properly (i.e., based on the integrity check), responder 163 may identify the address of originator 153 from header 206 of one of MAC frames 204 that was received properly. Responder 163 may transmit BA 214 to originator 153 using the address of originator 153. BA 214 may identify which of MAC frames 204 were received properly.

In some embodiments, BA 214 may include a bitmap that indicates that none of MAC frames 204 were received properly when none of MAC frames 204 were received properly. In some embodiments, aggregation header frame 202 may be treated as one of MAC frames 204 and the bitmap may indicate that aggregation header frame 202 was received properly. When at least one of MAC frames 204 was received properly, the bitmap may identify which of MAC frames 204 were received properly.

In some embodiments, the integrity checking portion of each of MAC frames 204 may comprise a cyclic-redundancy check (CRC) value calculated over the entire MAC frame 204 and included at the end of each MAC frame 204. Responder 163 may check the integrity each MAC frame 204 by performing a CRC for each MAC frame 204, although other types of integrity checks may be used. In some embodiments, the CRC value may comprise 32-bits (e.g., a CRC32), although the scope of the invention is not limited in this respect.

In some embodiments, aggregation 200 may be a physical packet, such as a Protocol Data Unit (PDU) or a Physical Layer Conversion Protocol (PLCP) Protocol Data Unit (PPDU). In these embodiments, aggregation 200 may include preamble 201 for packet detection. In some embodiments, MAC frames 204 comprise either MAC data packets or MAC Protocol Data Unit (MPDUs), although other types of individual frames may also be suitable.

In some embodiments, aggregation header frame 202 may comprise a MAC frame having only a header portion and without a payload portion. In these embodiments, aggregation header frame 202 may be devoid of data. In these embodiments, the plurality of MAC frames 204 of aggregation 200, including aggregation header frame 202, are concatenated together without any IFS therebetween to form aggregation 200. In these embodiments, responder 163 may treat aggregation header frame 202 as another MAC frame allowing it to easily identify originator 153, although the scope of the invention is not limited in this respect.

Because aggregation header frame 202 is much shorter than MAC frames 204, there is a much greater probability that it will be received properly by responder 163 and therefore a much greater probability that responder 163 will generate BA 214.

Aggregation header frame 202 may include a field for the originator's address. Aggregation header frame 202 may also include the a field for the responder's address, a field for the frame type, a quality-of-service (QoS) field and/or a sequence control field. The QoS filed may include information regarding QoS. In embodiments when aggregation header frame 202 includes QoS field, aggregation header frame 202 may be referred to as a QOS Null Frame, although the scope of the invention is not limited in this respect.

In some embodiments, aggregation header frame 202 may be no greater than 30 bytes. MAC frames 204 may range from up to 1000 bytes to 1500 bytes or more when high-quality video is being received or large files are being downloaded. MAC frames 204 may be on the order of 300 to 500 bytes when voice packets are being received. In some embodiments, the maximum number of MAC frames 204 in aggregation 200 may be limited to the number of frames that the bitmap field can identify, which may be sixty-four, although the scope of the invention is not limited in this respect. In some embodiments, the size of aggregation 200 may be limited to 64 KB, although the scope of the invention is not limited in this respect as aggregation 200 may be much larger. In some embodiments, MAC frames 204 may be 10 to 20 or more times larger than aggregation header frame 202 allowing aggregation header frame 202 to be easily received properly, although the scope of the invention is not limited in this respect.

In some embodiments, MAC frame headers 206 may be 24 bytes. In some embodiments, aggregation header frame 202 may be similar to one or more of headers 206, although the scope of the invention is not limited in this respect. In some embodiments, BA 214 may be transmitted after a short interframe spacing (SIFS) 212 following aggregation 200.

In some embodiments, aggregation header frame 202 may include an integrity checking portion (e.g., a CRC). In these embodiments, when none of MAC frames 204 of aggregation 200 are received properly (e.g., due to interference 210), responder 163 may perform an integrity check on aggregation header frame 202 prior to identifying the address of originator 153 from aggregation header frame 202.

In some embodiments, aggregation 200 may also include preamble 201 for use by PHY layer 112 (FIG. 1) to detect aggregation 200 (i.e., packet detection) and to generate a channel estimate. Preamble 201 may also include information about the duration of aggregation 200 as well as rate information for use by PHY layer 112 (FIG. 1) in decoding and demodulating aggregation 200, although the scope of the invention is not limited in this respect.

Figure 3:
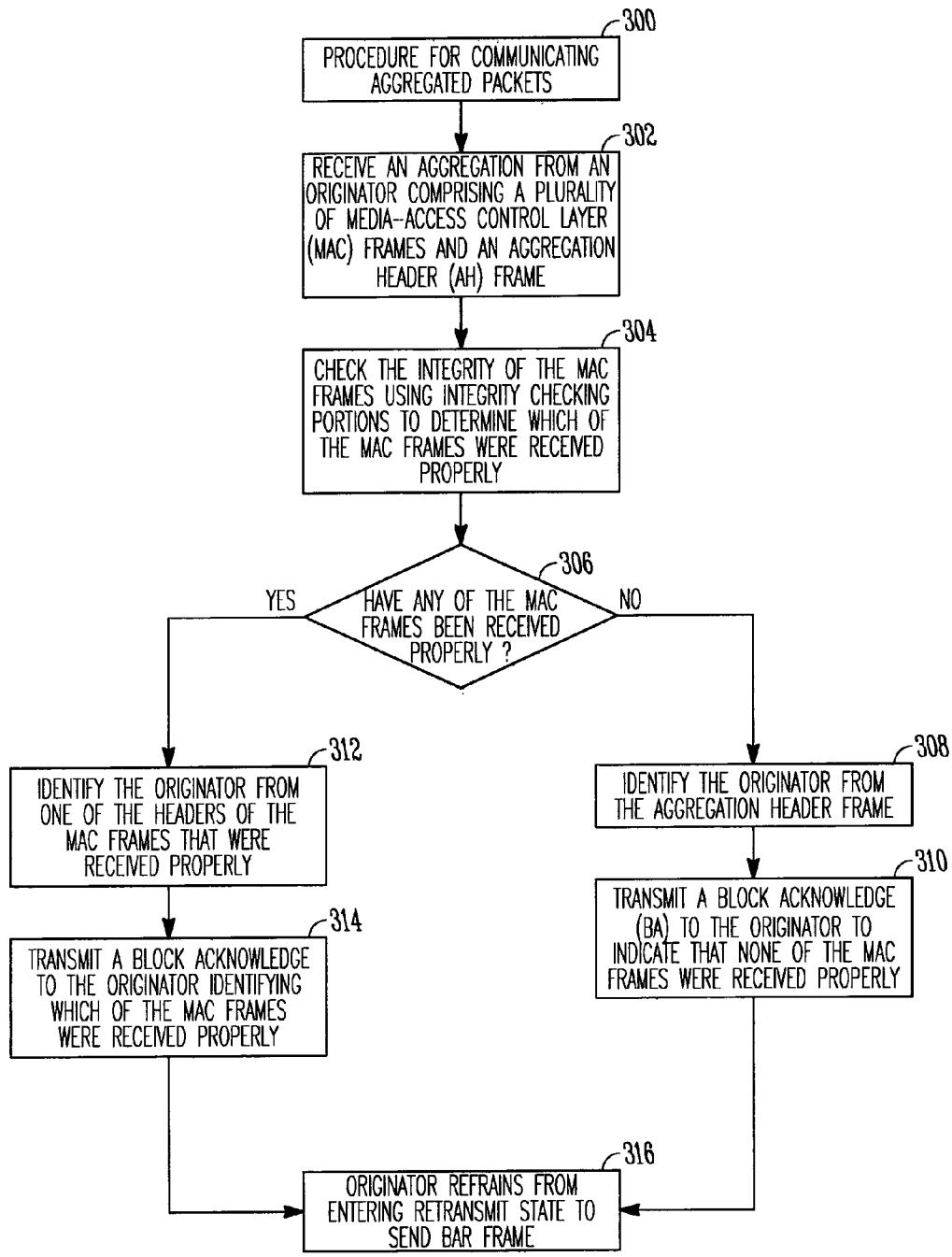
FIG. 3 is a flow chart of a procedure for communicating aggregated packets in accordance with some embodiments of the present invention.

FIG. 3 is a flow chart of a procedure for communicating aggregated packets in accordance with some embodiments of the present invention. Procedure 300 may be performed by a responder, such as responder 163 (FIG. 1).

Operation 302 comprises receiving an aggregation, such as aggregation 200 (FIG. 2), from an originator comprising a plurality of MAC frames and an aggregation header frame.

Operation 304 comprises checking the integrity of the MAC frames using integrity checking portions to determine which of the MAC frames were received properly.

Operation 306 comprises determining if any of the MAC frames of the aggregation (other than the aggregation header frame) are received properly. When none of the MAC frames of the aggregation (other than the aggregation header frame) are received properly, operations 308 and 310 are performed. When at least one of the MAC frames of the aggregation (other than the aggregation header frame) is received properly, operations 312 and 314 are performed.

Operation 308 comprises identifying an address of the originator from the aggregation header frame. In some embodiments, operations 304, 306, and 308 may be performed concurrently in which PHY layer circuitry 112 (FIG. 1) may parse the frames of aggregation 200 (FIG. 2) in the order in which they are received. In these embodiments, the address of the originator may be determined from aggregation header frame 202 (FIG. 2) prior to determining if MAC frames 204 (FIG. 2) are received properly. It should be noted that there is no requirement to identify the address of the originator from the aggregation header frame only after when the address of the originator cannot be identified from headers 206 (FIG. 2).

Operation 310 comprises transmitting a BA to the originator using the address of the originator determined from the aggregation header frame. The BA may indicate that none of the MAC frames were received properly. In response to receipt of the BA, the originator may refrain from entering a retransmit state and may not need to send a BAR frame to the responder to request a BA, as indicated in operation 316.

Operation 312 comprises identifying the address of the originator from a header 206 (FIG. 2) of one of the MAC frames that was received properly. In operation 312, the address of the originator may be identified from aggregation header frame 202 (FIG. 2) and/or header 206 (FIG. 2) of one of MAC frames 204 (FIG. 2).

Operation 314 comprises transmitting a BA to the originator. The BA may identify which of the MAC frames were received properly.

In operation 316, the originator may refrain from entering the retransmit state to request a BA by sending a BAR frame. In these embodiments, the originator can retransmit the MAC frames that were indicated in the BA as improperly received without using a BAR frame.

Although the individual operations of procedure 300 are illustrated and described as separate operations, one or more of the individual operations may be performed concurrently, and nothing requires that the operations be performed in the order illustrated.

Figure 4:
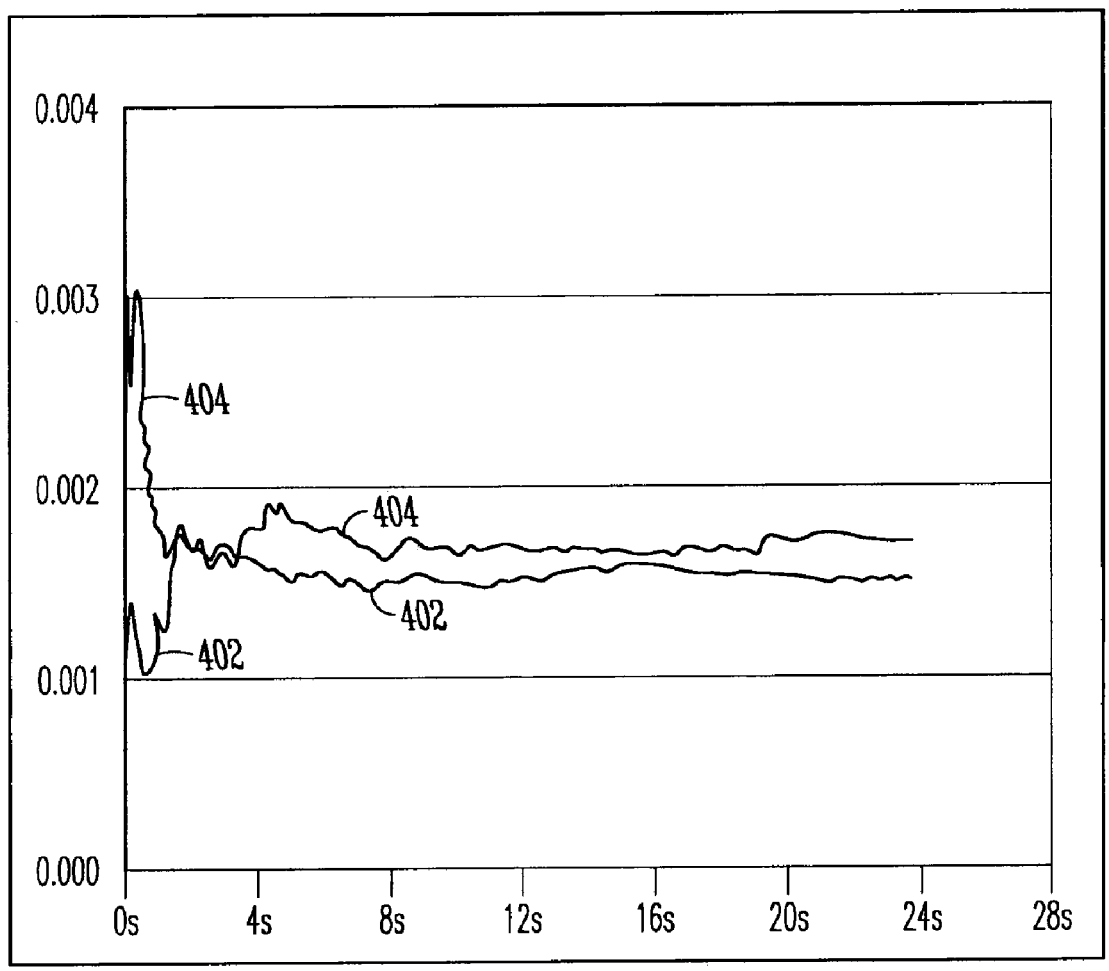
FIG. 4 illustrates an average packet delay in accordance with some embodiments of the present invention in comparison with an average packet delay of some conventional systems.

FIG. 4 illustrates an average packet delay in accordance with some embodiments of the present invention in comparison with an average packet delay of some conventional systems. Graph 402 illustrates the average packet delay in accordance with some embodiments of the present invention that use aggregation header frame 202 (FIG. 2). Graph 404 illustrates the average packet delay without the use of aggregation header frame 202 (FIG. 2). The average packet delay illustrated by graph 402 may be about 10% lower than the average packet delay illustrated by graph 404. Graphs 402 and 404 were generated by simulating a peer-to-peer connection between two wireless communication devices.

Some embodiments of the present invention may be suitable for use for time-sensitive, high bandwidth information, such as video streaming particularly in bandwidth limited situations, and in situations with high interference (e.g., where stations from neighboring WLANS may cause errors), although the scope of the invention is not limited in this respect.

In some embodiments, wireless communication device 103 and/or wireless communication device 113 may be part of a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, wireless communication device 103 and/or wireless communication device 113 may communicate in accordance with one or more communication techniques and/or standards.

In some embodiments, wireless communication device 103 and/or wireless communication device 113 may communicate orthogonal frequency division multiplexed (OFDM) communication signals over a multicarrier communication channel. The OFDM signals may comprise a plurality of orthogonal subcarriers. In some of these multicarrier embodiments, wireless communication device 103 and/or wireless communication device 113 may be a wireless local area network (WLAN) communication station such as a wireless access point (AP), base station, or a mobile device including a Wireless Fidelity (WiFi) device. In some of the multicarrier embodiments, wireless communication device 103 and/or wireless communication device 113 may be part of a broadband wireless access (BWA) network communication station, such as a Worldwide Interoperability for Microwave Access (WiMax) communication station, although the scope of the invention is not limited in this respect.

In some embodiments, wireless communication device 103 and/or wireless communication device 113 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for WLANs, although the scope of the invention is not limited in this respect as they may also be suitable to transmit and/or receive communications in accordance with other techniques and standards. In some embodiments, wireless communication device 103 and/or wireless communication device 113 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

Antennas 101 and 111 may comprise one or more directional or omnidirectional antennas, including, for example, dipole antennas, monopole antennas, patch antennas, loop antennas, microstrip antennas, or other types of antennas suitable for transmission of radio-frequency (RF) signals. In some embodiments, instead of two or more antennas, a single antenna with multiple apertures may be used. In these embodiments, each aperture may be considered a separate antenna. In some multiple-input, multiple-output (MIMO) embodiments, antennas 101 and antennas 111 may be effectively separated to take advantage of spatial diversity and the different channel characteristics that may result between each of antennas 101 and each of antennas 111.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a responder for acknowledging frames in an aggregation comprising:
   receiving an aggregation from an originator, the aggregation comprising a plurality of media-access control layer (MAC) frames and an aggregation header frame that identifies the originator;
   checking the integrity of the MAC frames using integrity checking portions to determine which of the MAC frames were received properly;
   when none of the MAC frames of the aggregation are received properly, the method further comprises:
   identifying the originator from the aggregation header frame; and
   transmitting a block acknowledge (BA) to the originator, the BA indicating that none of the MAC frames were received properly,
   wherein the aggregation header frame includes an integrity checking portion for use in performing an integrity check on the a aggregation header frame prior to identifying the originator from the aggregation header frame when none of the MAC frames are received properly.

2. the method of claim 1 wherein the BA is an implicit BA, and
   wherein, in response to receipt of the implicit BA, the originator refrains from entering a retransmit state to refrain from transmitting a block acknowledge request frame to the responder to request a BA.

3. The method of claim 1 wherein each of the MAC frames of the aggregation comprises a header and a payload and including an integrity checking portion, wherein when at least one of the MAC frames of the aggregation is received properly, the method further comprises:
identifying the originator from the header of one of the MAC frames that was received properly or the aggregation header frame; and
transmitting a BA to the originator, the BA identifying which of the MAC frames were received properly.

4. The method of claim 3 wherein the BA comprises a bitmap,
wherein the bitmap indicates that none of the MAC frames were received properly when none of the MAC frames were received properly, and
wherein the bitmap identifies which of the MAC frames were received properly when at least one of the MAC frames was received properly.

5. The method of claim 3 wherein the integrity checking portion of each of the MAC frames comprises a cyclic-redundancy check (CRC) value calculated over the entire MAC frame and included at the end of each MAC frame, and
wherein checking the integrity comprises performing a CRC for each MAC frame.

6. The method of claim 3 wherein the BA is transmitted after a short interframe spacing following the aggregation.

7. The method of claim 3
wherein when none of the MAC frames of the aggregation are received properly, the method further comprises performing an integrity check on the aggregation header frame prior to identifying the originator from the aggregation header frame.

8. The method of claim 1 wherein the aggregation comprises a Physical Layer Conversion Protocol Data Unit and includes a preamble for use in packet detection, and
wherein the MAC frames comprise MAC Protocol Data Units.

9. The method of claim 1 wherein the aggregation header frame comprises a MAC frame having a header and without a payload, and
wherein the plurality of MAC frames of the aggregation, including the aggregation header frame, are concatenated together without any interframe space therebetween to form the aggregation.

10. The method of claim 9 wherein the aggregation header frame includes an originator's address field and one or more of a receiver's address field, a frame type field, a quality-of-service field and a sequence control field.

11. The method of claim 10 wherein the aggregation header frame is no greater than 30 bytes, and wherein the aggregation is at least 1000 bytes.

12. The method of claim 10 wherein the aggregation header frame is no greater than 5 percent of the size of the aggregation.

13. A wireless communication device comprising:
media-access control (MAC) layer circuitry to check the integrity of frames of an aggregation received from an originator using integrity checking portions to determine which of MAC frames were received properly, the aggregation comprising a plurality of the MAC frames and an aggregation header frame that identifies the originator,
wherein when none of the MAC frames of the aggregation are received properly, the MAC circuitry is to identify the originator from the aggregation header frame, and the wireless communication device is to transmit a block acknowledge (BA) to the originator, the BA indicating that none of the MAC frames were received properly, and
wherein the a aggregation header frame includes an integrity checking portion for use in performing an integrity check on the aggregation header frame prior to identifying the originator from the aggregation header frame when none of the MAC frames are received properly.

14. The wireless communication device of claim 13 wherein the BA is an implicit BA, and
wherein, in response to receipt of the implicit BA, the originator refrains from entering a retransmit state to refrain from transmitting a block acknowledge request frame to the wireless communication device to request a BA.

15. The wireless communication device of claim 13 wherein each of the MAC frames of the aggregation comprises a header and a payload and including an integrity checking portion,
wherein when at least one of the MAC frames of the aggregation is received properly:
the MAC layer circuitry identifies the originator from the header of one of the MAC frames that was received properly or the aggregation header frame; and
the BA is transmitted to the originator, the BA identifying which of the MAC frames were received properly.

16. The wireless communication device of claim 15 wherein the aggregation header frame comprises a MAC frame having a header and without a payload, and
wherein the plurality of MAC frames of the aggregation, including the aggregation header frame, are concatenated together without any interframe space therebetween to form the aggregation.

17. The wireless communication device of claim 16 wherein the aggregation header frame includes an originator's address field and one or more of a receiver's address field, a frame type field, a quality-of-service field and a sequence control field.

18. The wireless communication device of claim 17 wherein the aggregation header frame is no greater than 5 percent of the size of the aggregation.

19. The wireless communication device of claim 15
wherein when none of the MAC frames of the aggregation are received properly, an integrity check is performed on the aggregation header frame prior to identifying the originator from the aggregation header frame.

20. A system comprising:
one or more antennas;
physical (PHY) layer circuitry to receive an aggregation from an originator using the one or more antennas, the aggregation comprising a plurality of media-access control (MAC) frames and an aggregation header frame that identifies the originator; and
MAC layer circuitry to check the integrity of the MAC frames using integrity checking portions to determine which of the MAC frames were received properly,
wherein when none of the MAC frames of the aggregation are received properly, the MAC circuitry is to identify the originator from the aggregation header frame, and the PHY layer circuitry is to transmit a block acknowledge (BA) to the originator, the BA indicating that none of the MAC frames were received properly,
wherein the aggregation header frame includes an integrity checking portion for use in performing an integrity check on the aggregation header frame prior to identifying the originator from the aggregation header frame when none of the MAC frames are received properly.

21. The system of claim 20 wherein each of the MAC frames of the aggregation comprises a header and a payload and including an integrity checking portion, wherein when at least one of the MAC frames of the aggregation is received properly:
the MAC layer circuitry identifies the originator from the header of one of the MAC frames that was received properly or the aggregation header frame; and
the BA is transmitted to the originator, the BA identifying which of the MAC frames were received properly.

22. The system of claim 21 wherein the aggregation header frame comprises a MAC frame having a header and without a payload, and
wherein the plurality of MAC frames of the aggregation, including the aggregation header frame, are concatenated together without any interframe space therebetween to form the aggregation.

23. The system of claim 22 wherein the aggregation header frame includes an originator's address field and one or more of a receiver's address field, a frame type field, a quality-of-service field and a sequence control field.

24. The system of claim 23 wherein the aggregation header frame is no greater than 5 percent of the size of the aggregation.

25. The system of claim 22 wherein the aggregation header frame includes an integrity checking portion, and
wherein when none of the MAC frames of the aggregation are received properly, an integrity check is performed on the aggregation header frame prior to identifying the originator from the aggregation header frame.

* * * * *

UNITED STATES PATENT AND TRADEMARK OFFICE
CERTIFICATE OF CORRECTION

PATENT NO.        : 8,270,437 B2
APPLICATION NO.   : 12/601915
DATED             : September 18, 2012
INVENTOR(S)       : Dmitry V. Akhmetov It is certified that error appears in the above-identified patent and that said Letters Patent is hereby corrected as shown below:

On the Title Page, References Cited

On page 2, in column 1, under "Other Publications", line 3, delete "Metopolitan" and insert --Metropolitan--, therefor On page 2, in column 1, under "Other Publications", line 4, delete "Medium" and insert --Media--, therefor On page 2, in column 1, under "Other Publications", line 5, delete "Medium" and insert --Media--, therefor In the Claims Column 8, line 56, in Claim 1, after "the", delete "a", therefor Column 8, line 59, in Claim 2, delete "the" and insert --The--, therefor Column 9, line 25, in Claim 7, after "claim 3", delete "¶", therefor Column 10, line 1, in Claim 13, after "the", delete "a", therefor Column 10, line 5, in Claim 13, delete "property." and insert --properly.--, therefor Signed and Sealed this
Twenty-fifth Day of November, 2014

Michelle K. Lee
*Deputy Director of the United States Patent and Trademark Office*